United States Patent
Lian (10) Patent No.: US 12,456,883 B2
(45) Date of Patent: Oct. 28, 2025

(54) WIRELESS POWERED MINIATURE CIRCUIT BREAKER (MCB)

(71) Applicant: DENG KAI SDN BHD, Selangor (MY)

(72) Inventor: Thng Kaih Lian, Selangor (MY)

(73) Assignee: DENG KAI SDN BHD, Selangor (MY)

( * ) Notice: Subject to any disclaimer, the term of this patent is extended or adjusted under 35 U.S.C. 154(b) by 0 days.

(21) Appl. No.: 18/564,243

(22) PCT Filed: Apr. 13, 2022

(86) PCT No.: PCT/MY2022/050023
§ 371 (c)(1),
(2) Date: Nov. 27, 2023

(87) PCT Pub. No.: WO2023/200328
PCT Pub. Date: Oct. 19, 2023

(65) Prior Publication Data
US 2024/0275212 A1 Aug. 15, 2024

(51) Int. Cl.
 H02J 50/12 (2016.01)
 H02J 50/20 (2016.01)
 H02J 50/40 (2016.01)
 H02J 50/80 (2016.01)

(52) U.S. Cl.
 CPC .............. *H02J 50/12* (2016.02); *H02J 50/20* (2016.02); *H02J 50/402* (2020.01); *H02J 50/80* (2016.02)

(58) Field of Classification Search
None
See application file for complete search history.

(56) References Cited

U.S. PATENT DOCUMENTS

| | | | |
|---|---|---|---|
| 10,675,982 B2* | 6/2020 | Fontana | B60L 53/60 |
| 2009/0091416 A1 | 4/2009 | Tang et al. | |
| 2010/0084920 A1 | 4/2010 | Banting et al. | |
| 2010/0264906 A1 | 10/2010 | Shamir et al. | |
| 2012/0091820 A1 | 4/2012 | Campanella et al. | |
| 2013/0329331 A1* | 12/2013 | Erger | H01H 71/04 361/102 |
| 2014/0146431 A1 | 5/2014 | Franks et al. | |
| 2015/0227149 A1 | 8/2015 | Manakawala | |
| 2018/0321651 A1* | 11/2018 | Blanchard | F24F 11/88 |
| 2022/0043038 A1* | 2/2022 | Matan | H02J 3/46 |

\* cited by examiner

*Primary Examiner* — Adi Amrany
(74) *Attorney, Agent, or Firm* — MUNCY, GEISSLER, OLDS & LOWE, P.C.

(57) ABSTRACT

A system configured to power up a plurality of electronic circuit breaker apparatus wirelessly includes a transmitter control unit acting as the power supply source and main hub for controlling the receiver antenna; a source resonator powered by the transmitter control unit and the source resonator having a transmitter IC and a transmitter antenna, a plurality of circuit breaker apparatus having a device resonator having a receiver IC and a receiver antenna for receiving the radiofrequency energy emitted by the transmitter antenna to power on the receiver IC, a monitoring unit for obtaining power consumption usage data of the powered devices connected to the line current, a controller unit for controlling and interrupting current supply to the line current; and a remote unit to receive the power usage data and transmit a signal to the controller unit for stop or supply the line current to the powered devices.

9 Claims, 6 Drawing Sheets

WIRELESS POWERED MINIATURE CIRCUIT BREAKER (MCB)

FIELD OF TECHNOLOGY

The present innovation generally relates to wireless energy transfer or wireless power transfer for circuit breaker apparatus, and in particular Electronic Circuit Breakers (ECB) which are designed to protect an electrical circuit from damage and monitor current usage.

BACKGROUND OF THE INNOVATION

Circuit breaker apparatuses provide protection in electrical systems by monitoring characteristics of the electrical power supplied to loads and interrupt the flow when fault conditions (e.g., arc faults, ground faults, unsafe current level) are detected. Some circuit breaker apparatuses additionally allow for remote control, such as the ability to open or close the circuit breaker's detachable contacts in response to an external control signal.

In Iraq, power generating companies sell electricity to each household based on the maximum current usage required. Unlike most countries, Iraqis use MCBs not only for protection in electrical systems, but also to limit their electricity usage. Common circuit breaker apparatus or MCBs usually needed to be reset manually after a trip occur. It will be wasting manpower and time consuming in locating the tripped circuit breaker apparatus if one is not familiar the whereabouts or the premises is very large which may impact the production line or one's daily activity. Electronic Circuit Breaker (ECB) is improved version of MCB, tackling this challenge by resetting the circuit breaker apparatus automatically after a period of time set by the user, which is beneficial to Iraqi users as well as users from other countries.

The conventional way of powering up ECB is by using Live and Neutral wire. However, this system, raises the cost of additional wiring and circuit breaker panels size due to ECB size is doubled compare to MCB, as well as the time it takes to maintain them if sudden breakdown were to occur.

Therefore, a need exists for circuit breaker apparatuses that has less complexity and that require less external wiring at the circuit breaker panels for powering the circuit breaker apparatuses is desirable.

SUMMARY OF THE PRESENT INNOVATION

One embodiment of invention relates to a system configured to monitor and programme operation of a circuit breaker apparatus, wherein system comprising: a wireless power transmission systems providing power supply to the circuit breaker apparatus in which the wireless power transmission systems comprising a source resonator positioned inside the circuit breaker panel and a device resonator positioned inside the circuit breaker apparatus separated by a distance, such that the source resonator wirelessly transmit power to the device resonator; a line current from the circuit breaker apparatus for powering at least one powered devices; a monitoring unit coupled to the circuit breaker apparatus for obtaining current usage data of the powered devices connected to the line current; a controller unit coupled to the circuit breaker apparatus for controlling and interrupting current supply to the line current; a remote unit to receive the power usage data and transmit a signal to the controller unit for stop or supply the line current to the powered devices; and a wireless transmitter unit coupled to the monitoring unit and the controller unit, characterized in that the wireless transmitter unit transmit the power usage data to the remote unit located remotely for to monitor electric usage and process the signal from the remote unit to stop or supply the line current using the controller unit.

Further, the system includes a processor to process operation of the monitoring unit and the controller unit.

Further, the circuit breaker apparatus comprising a seven-segment display or LED display to display status indication of the circuit breaker.

Preferably, the circuit breaker panel has a rail to mount the circuit breaker apparatus.

Preferably, the circuit breaker panel has printed circuit board antenna shaped as a rail or panel to mount the circuit breaker apparatus.

Preferably, the source resonator is a printed circuit board antenna, where the printed circuit board antenna is slid or attached onto the circuit breaker panel.

Preferably, the wireless power transmission system uses a printed circuit board as antenna for both transmitter and receiver.

Preferably, the wireless power transmission system or the source resonator has Serial Peripheral Interface (SPI) and Power Supply Interface.

Preferably, the source resonator has transmitter antenna.

Preferably, the device resonator has receiver antenna.

Preferably, the source resonator powers a pluralities of other circuit breaker apparatus within the circuit breaker panel.

Preferably, the remote unit located remotely for to monitor power usage and turn current supply on and off using the controller unit.

Preferably, the circuit breaker apparatus comprising a capacitor coupled to the line current or wireless power transmission systems to store backup-power to provide back-up power supply to the circuit breaker in case of short-circuit.

Preferably, the remote unit is a mobile device having an interface to receive and transmit data or signal from the circuit breaker apparatus.

Further, the circuit breaker panel has a ferrite sheet to block and absorb electromagnetic noises produced by the wireless power transmission systems.

Preferably, the wireless power transmission system is a power from a utility source.

Preferably, the controller unit coupled to a sensing circuitry for performing the circuit breaker operation of the circuit breaker apparatus.

Preferably, the wireless transmitter unit connected to a network or wireless network transmit the data or receive the signal.

Preferably, the remote unit connected to a network or wireless network receive the data or transmit the signal.

The present innovation consists of features and a combination of parts hereinafter fully described and illustrated in the accompanying drawings, it being understood that various changes in the details may be made without departing from the scope of the innovation or sacrificing any of the advantages of the present innovation.

BRIEF DESCRIPTION OF THE DRAWINGS

To further clarify various aspects of some embodiments of the present innovation, a more particular description of the innovation will be rendered by references to specific embodiments thereof, which are illustrated in the appended drawings. It is appreciated that these drawings depict only typical embodiments of the innovation and are therefore not to be considered limiting of its scope. The innovation will be described and explained with additional specificity and detail through the accompanying drawings in which.

DETAILED DESCRIPTION OF THE INNOVATION

One embodiment of the innovation relates to a method and system configured to monitor and programme operation of a circuit breaker apparatus.

Figure 1:
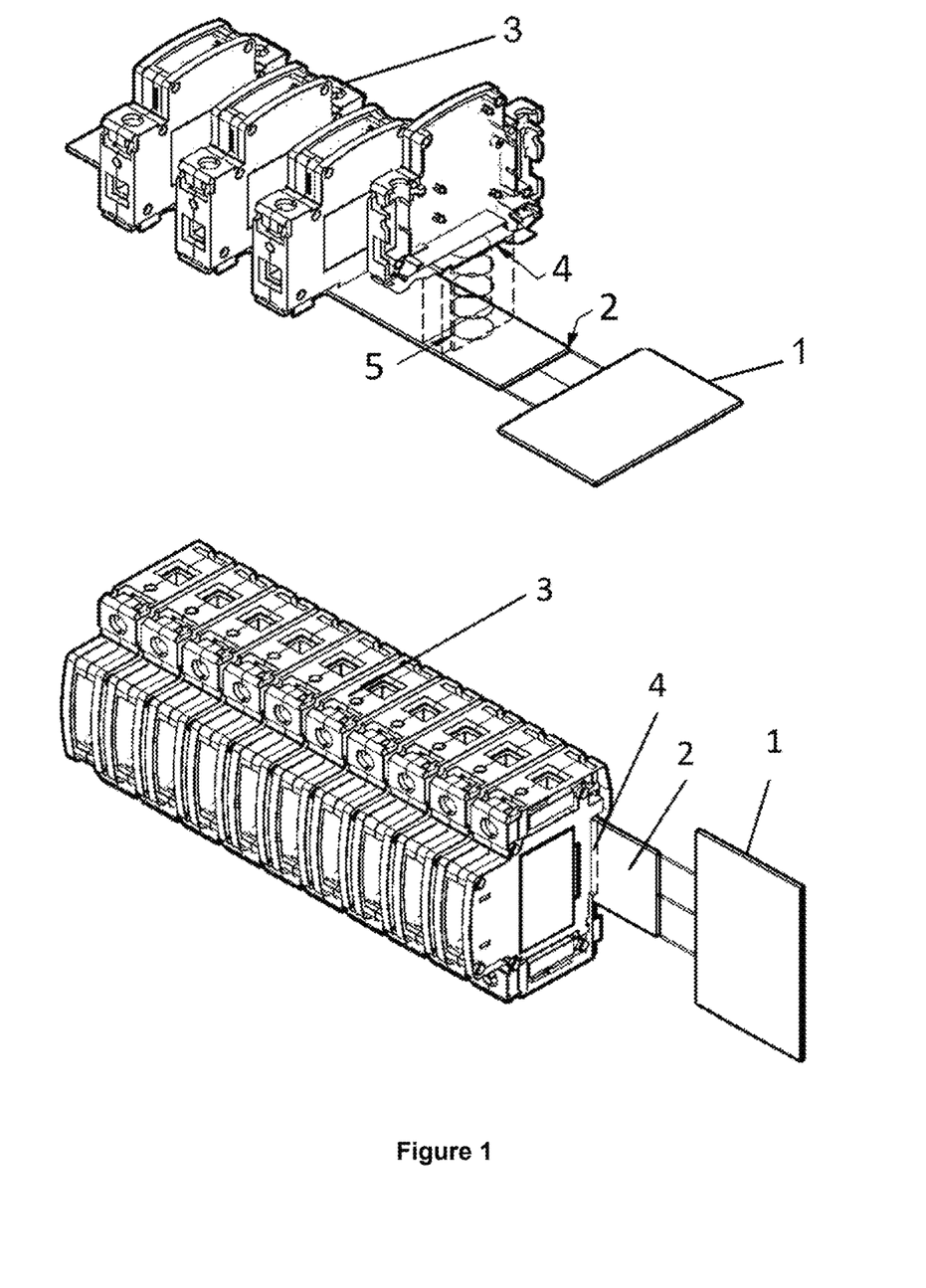
FIG. 1 illustrates one embodiment of the Electronic Circuit Breakers (ECB) with Wireless Power Transmission System.

The present invention relates to a system configured to power up electronic circuit breaker apparatus wirelessly. Wireless energy transfer has the potential to transmit radio frequency (RF) energy over close distances. This RF energy, if it were to be harnessed, it could open up new opportunity in powering up circuit breaker apparatuses as illustrated in FIG. 1. The system comprises of two main parts, at least one energy transmitter (1) and at least one energy receiver electrical miniature circuit breaker (EMCB) or circuit breaker (3). The transmitter antenna (2) connected to the energy transmitter (1) continuously radiates RF energy (5) to its surrounding, which powers up the circuit breaker (3) apparatus through the receiver antenna (4). Thus, isolating and eliminating the need of relying electricity from live wires to power up the components within the circuit breaker apparatus.

Figure 2:
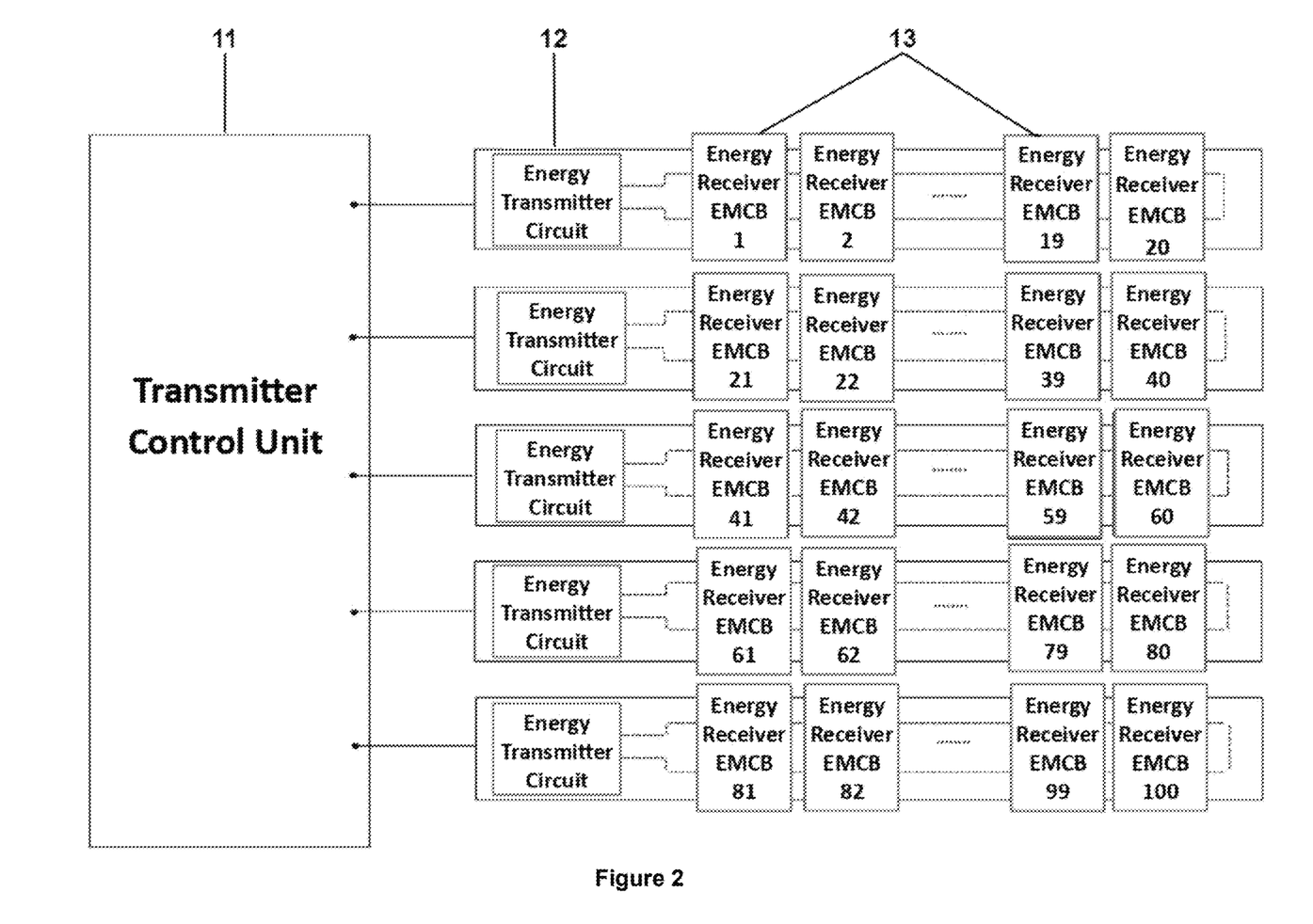
FIG. 2 illustrates one embodiment of the Wireless Power Transmission system.
Figure 7:
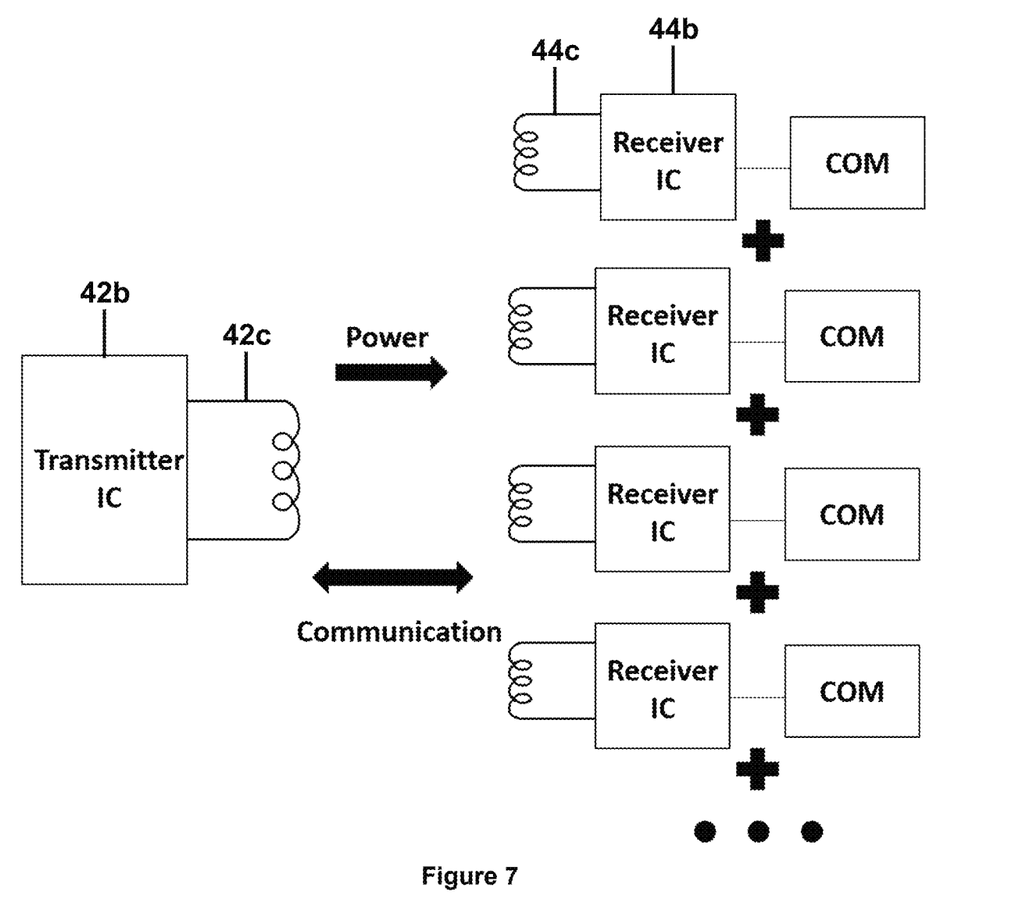
FIG. 7 illustrates details of the embodiment of the Wireless Power Transmission system as mentioned in FIG. 2.

The system as illustrated in FIG. 2 and FIG. 7, comprises at least one energy transmitter control unit (11), at least one energy transmitter circuit (12) and at least one energy receiver for EMCB or circuit breaker (13).

Figure 3:
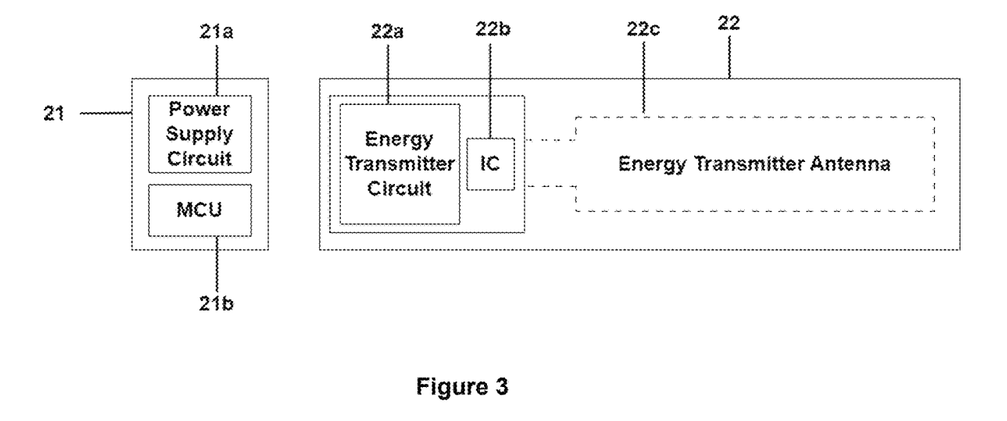
FIG. 3 illustrates details of the Energy Transmitter of the Wireless Power Transmission system.

As illustrated in FIG. 3, the energy transmitter comprising: an energy transmitter circuit (22*a*) and a loop of embedded antenna (22*c*) from antenna circuit for channeling RF energy. The transmitter control unit (21) acting as the power supply source and main hub for controlling the embedded antenna circuit (22). The transmitter control unit (21) consists of a switch mode power supply (SMPS) circuit (21*a*) that provides power to the short-range wireless technology Bluetooth® microcontroller unit (MCU) (21*b*) and the energy transmitter circuit (22*a*), as well as allowing exchange of data between short-range wireless technology Bluetooth® MCU and the energy transmitter IC (22*b*). Preferably, a loop of copper conductor or antenna (22*c*) is embedded onto a printed circuit board (PCB) (22) or rail of a circuit breaker panel which acts as the transmitter antenna.

Figure 4:
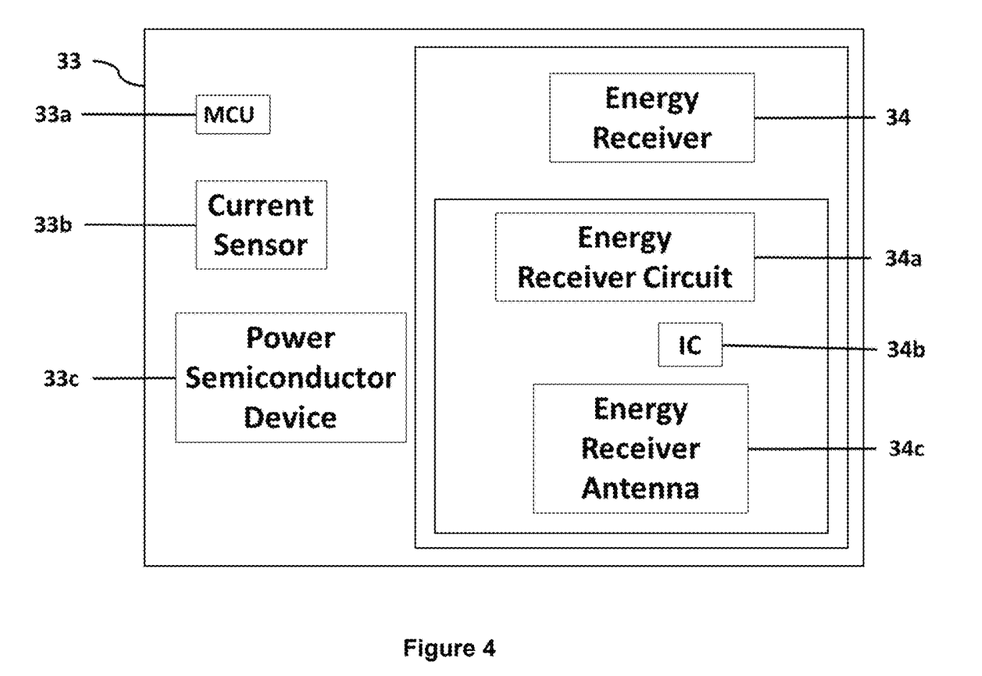
FIG. 4 illustrates details of the Energy Receiver of the Wireless Power Transmission system.

As illustrated in FIG. 4, the energy receiver of circuit breaker or EMCB (33) comprising: an energy receiver circuit (34*a*) and a loop of embedded antenna (34*c*) coupled to the circuit breaker apparatus for harvesting the RF signal; a monitoring unit (33*b*) coupled to the circuit breaker apparatus for obtaining current usage data of the powered devices connected to the line current; a controller unit coupled to the circuit breaker apparatus for controlling and interrupting current supply to the line current when detected fault condition; a remote unit to receive the power usage data and transmit a signal to the controller unit for stop or supply the line current to the powered devices. The receiver antenna (34*c*) is coupled together with the transmitter antenna where the energy receiver IC (34*b*) converts a portion of that RF signal into energy. As illustrated in FIG. 4, the system of the circuit breaker apparatus comprising, an input power or a load current connection and an output power or a line current connection at the circuit breaker apparatus, wherein the line current from the circuit breaker apparatus for powering at least one powered device, or sockets for appliances such as lighting, fan, and such. The system has a monitoring module or monitoring unit (33*b*) coupled to the circuit breaker apparatus for obtaining power usage data of the powered devices connected to the line current, wherein the monitoring unit (33*b*) is connected to the line current for processing the power usage connected powered devices to the same line current, in which the data will be transfer using a wireless terminal connected to the monitoring unit (33*b*) to a remote unit located remotely or connected wirelessly for at least one user to monitor the current usage or power usage of the circuit breaker apparatus. The system has a controller unit (33*c*) coupled to the circuit breaker apparatus for stop or supply the line current or controlling current supply to the line current in the circuit breaker apparatus, where a remote unit able to control the operation of the controller unit (33*c*) by transmitting a signal to the controller unit (33*c*) for stop or supply the line current to the powered devices. The system has a remote unit or mobile device to receive the power usage data and transmit a signal to the controller unit for stop or supply the line current to the powered devices, in which the mobile device has a display module for viewing the operation of the circuit breaker apparatus and controlling the operation of the circuit breaker apparatus or the controller unit. The mobile device could be a mobile phone, computer, or any other electronic device which can connect remotely via wireless network. The system has a wireless transmitter unit coupled to the monitoring unit (33*b*) and the controller unit (33*c*) placed within the circuit breaker apparatus, for transmitting and receiving data or signal remotely, the wireless transmitter unit is connected to a wireless network such as WIFI, 3G, 4G, or has a wireless transmitter such as short-range wireless technology Bluetooth®, NFC. The wireless transmitter unit transmit the power usage data to the remote unit located remotely for to monitor electric usage and process the signal from the remote unit to stop or supply the line current using the controller unit (33*c*). The system has a wireless power transmission systems provide power supply to the circuit breaker apparatus for powering the wireless transmitter unit, the controller unit (33*c*) and the monitoring unit (33*b*), in which the wireless power transmission systems comprising a source resonator positioned inside the circuit breaker panel and a device resonator positioned inside the circuit breaker apparatus separated by a distance, such that the source resonator wirelessly transmit power to the device resonator. Further the circuit breaker apparatus has a LED for status indication of the circuit breaker apparatus, buttons for setting up or adjusting settings of the circuit breaker apparatus, and seven segment display to display the measurement or indicate status of settings.

Figure 5:
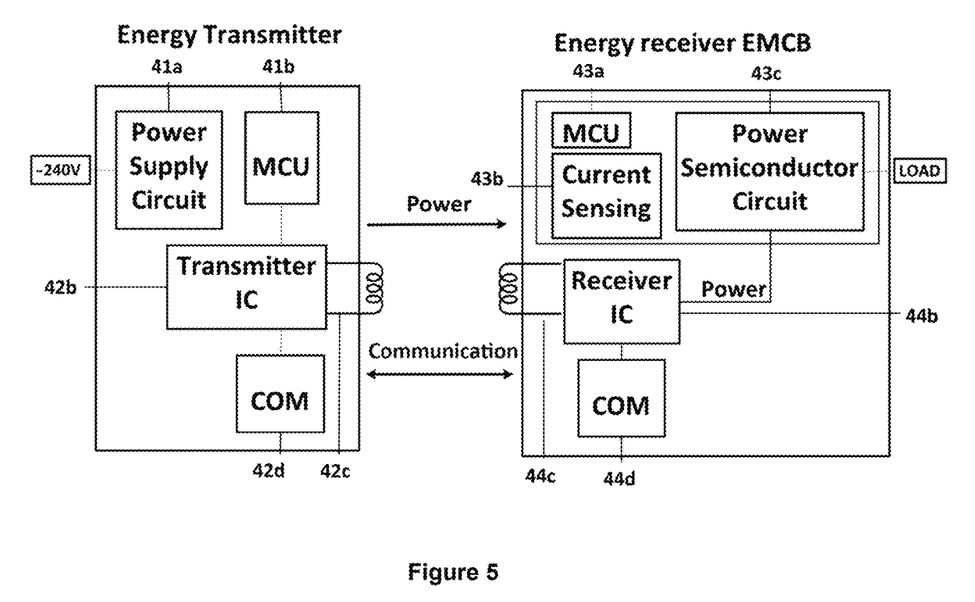
FIG. 5 illustrates one embodiment of the Transmitter-Receiver Block Diagram.

FIG. 5 illustrates the block diagram concept of energy transmitter and energy receiver. The transmitter drives an external antenna through antenna driver output pins to generate the RF field. The drivers are designed to directly drive antenna(s) integrated on the PCB as well as antennas connected with 50Ω cables. In this design, these drivers are differentially driving the external antenna.

When power on, the short-range wireless technology Bluetooth® MCU (41b) initiates the transmitter IC (42b). Thereafter, the pins of the antenna driver output an unmodulated carrier signal at 13.56 MHz. These unmodulated carrier signal first passes through the EMI filter and matching circuit, before reaching the antenna. The EMI filter will then filter out high harmonics, extracting and removing electromagnetic noise from noisy components whereas the matching circuit matches the source impedance to the load impedance. Thus, the transmitter antenna (42c) receives maximum power of the signal with minimum reflection from the load. Finally, the transmitter antenna (42c) can radiate the signal, which is also known as RF energy across space.

The transmitter antenna (42c) and receiver antenna (44c) are mutually coupled together. By means of a tuned receiver antenna, RF energy can be transferred from the transmitter antenna, using similar principle like a voltage transformer. RF energy exchange can be optimized when both the transmitter and receiver antennas are tuned to the same frequency, known as resonant frequency. Thus, allowing maximum power transfer between the antennas by reducing the signal reflection. The receiver antenna is connected to an internal rectifier packaged in the IC, where the RF energy undergoes full wave rectification. A portion of this energy is used to power up the receiver's IC. While the remaining energy outputs to the output pin, which are then used to supply to other circuitry components (e.g., IC, relay, LED).

When power is sufficient, data exchange can be done between transmitter and receiver. To send command to the receiver, the transmitter first performs ASK modulation on the carrier. These modulated signals will be radiated across space and received by the receiver antenna (44c). The receiver consists of a demodulator capable of performing AM demodulation. Once the signal has been demodulated, the receiver is able to access and extract information within it.

At the end of the request, the transmitter keeps the unmodulated carrier signal to power the receiver, and allow it to generate an acknowledgement. When the receiver is ready to respond, it performs passive load modulation technique by changing its antenna impedance. Therefore, the receivers IC (44b) input impedance variation modulates the acknowledgement signal across the transmitter antenna. The transmitter receives the modulated signal and performs demodulation, thus retrieving the acknowledgement.

Figure 6:
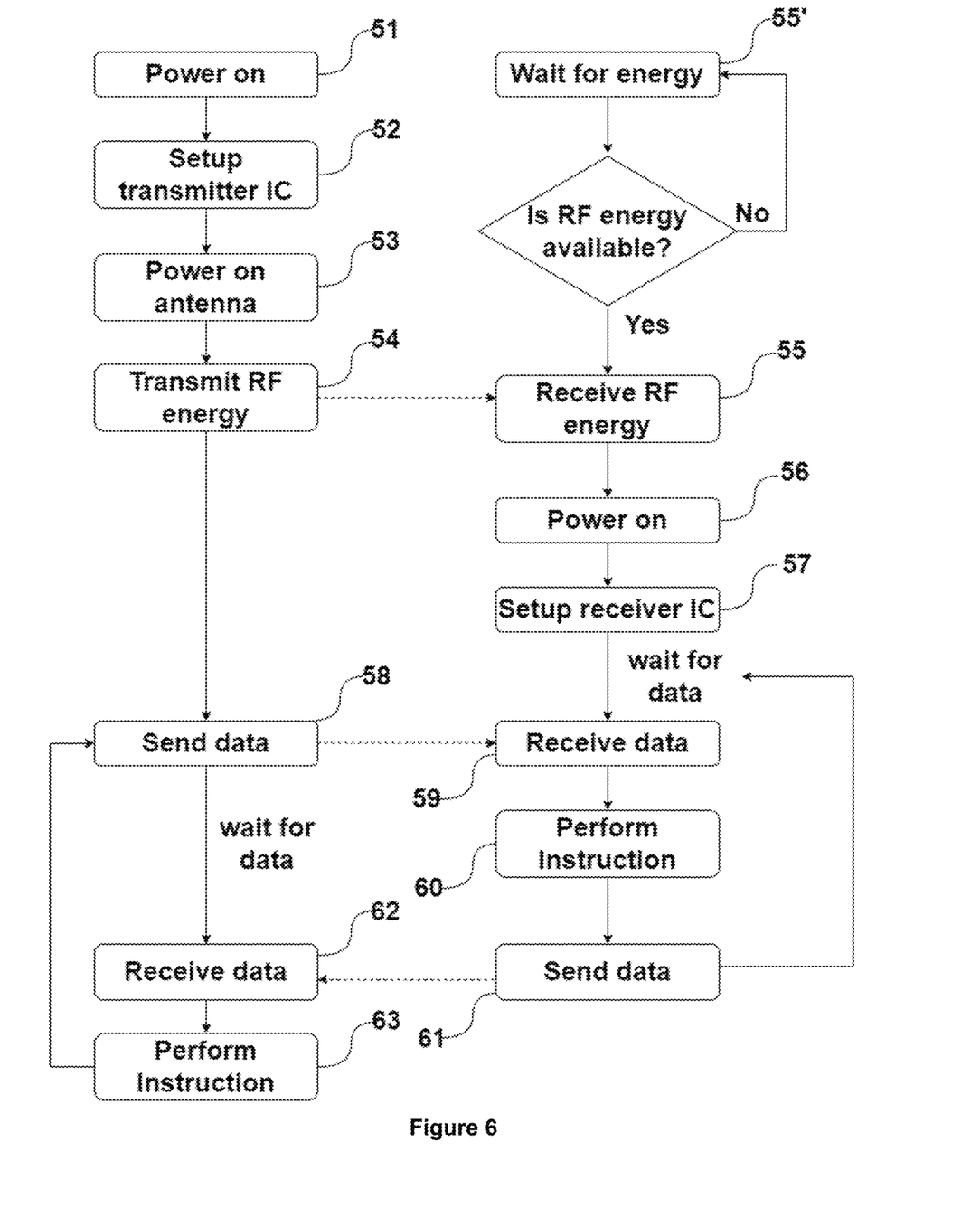
FIG. 6 illustrates a flow chart of a Wireless Power Transmission system.

As illustrated in FIG. 6, the method of operation of the system comprising steps of:

Transmitter control unit powers up energy transmitter circuit (51), in which energy transmitter circuit having Integrated Circuit (IC) connected, sets up Transmitter IC to perform wireless power transmission operation (52).

Thereafter, the Transmitter IC channeling power to antenna (53) and radiate RF energy (54), where at the same time, Receiver IC will be waiting (55') for RF energy until its made available or received (55).

Then, the Receiver antenna receive RF energy, power on (56) and setup the Receiver IC embedded or affixed onto the circuit breaker (57). The Transmitter IC then sends data for communication to the Receiver IC (58). The Receiver IC receives data (59) and process the data, perform embedded instructions (60) and transmit back acknowledgement for the transmitter IC (61). The Receiver IC also will check and wait for additional data from transmitter IC, if there is any.

Otherwise, the Receiver IC transmit the acknowledgement to the transmitter IC, where the transmitter IC receives data (62) to perform additional instructions and sends data to receiver IC if required (63).

Every component (e.g., MCU, relay, coil, LEDs) in the electronic circuit breaker apparatus are powered up by the converted RF energy without relying any power from live wires. The electronic circuit breaker apparatus collects current usage data periodically and determines whether it is overcurrent or short circuit. If it is, the relay will open its contact interrupting the current flow. After a period of time set by the user, the relay automatically resets itself, resuming current flow. Automatic reconnection eliminates the need for the user to manually reset the circuit breaker apparatus. A supercapacitor will also be mounted for temporary energy storage.

The design of the circuit breaker apparatus comprising, actuator lever used to trip and reset the circuit breaker apparatus automatically or manually. The position of the lever able indicate the status of the circuit breaker apparatus (On or Off/tripped).

The lever can be remotely controlled by having controller unit or relay control coupled to the circuit breaker apparatus, in which the relay control able to turn on automatically without the need to manually switch it back on during current surge or turn on remotely via wireless connection to the circuit breaker apparatus. Further the circuit breaker apparatus has a LED for status indication of the circuit breaker apparatus and buttons for setting up or adjusting settings of the circuit breaker apparatus. The circuit breaker apparatus has capacitor or supercapacitor for charged up for storing power for use of the circuit breaker apparatus components. The live supply is not required to power up the circuit breaker apparatus, as the circuit breaker apparatus has a completely isolated power supply to power up the circuit breaker apparatus components. The Live wire or live supply will only pass through a coil allowing current detection and exist as line current or output current for powering at least one powered device. The Relay control enables electrical miniature circuit breaker (EMCB), Electronic Circuit Breakers (ECB) or circuit breaker apparatus to turn on automatically without the need to manually switch it back on during current surge or short circuit. The short-range wireless technology Bluetooth® Low Energy (BLE) pairing between the circuit breaker apparatus and master controller or remote unit is done through using mobile application or buttons.

Another embodiment of the innovation relates to a circuit breaker having a sensing circuitry configured to sense a characteristic of a line current; a controller unit coupled to the sensing circuitry; a wireless transmitter unit; and a power system, characterized in that the power system configured provide a power supply to the wireless transmitter unit after a loss of the line current, for the wireless transmitter unit to transmit data about the characteristic to a monitoring module after the loss of the line current, wherein the power system is a wireless power transmission system, in which the wireless power transmission system comprises a source resonator configured to a circuit breaker panel and device resonator configured to the circuit breaker separated by a distance, such that the source resonator wirelessly transmit power to the device resonator in other positions within the circuit breaker panel.

The present invention relates to an Electronic Circuit Breakers (ECBs) which automatically operated electrical switches that are designed to protect an electrical circuit from damage and to turn on or off, monitor and collect the use status of the circuit and load equipment. Further, the system includes a processor to process operation of the monitoring unit and the controller unit.

Further, the circuit breaker apparatus comprising a seven-segment display or LED display to display status indication of the circuit breaker.

Preferably, the circuit breaker panel has a rail to mount the circuit breaker apparatus.

Preferably, the circuit breaker panel has printed circuit board antenna shaped as a rail or panel to mount the circuit breaker apparatus.

Preferably, the source resonator is a printed circuit board antenna, where the printed circuit board antenna is slid or attached onto the circuit breaker panel.

Preferably, the wireless power transmission system uses a printed circuit board as antenna for both transmitter and receiver.

Preferably, the wireless power transmission systems or each of the source resonator has Serial Peripheral Interface (SPI) and Power Supply Interface.

Preferably, the source resonator has transmitter antenna.

Preferably, the device resonator has receiver antenna.

Preferably, as shown in FIGS. 1, 2 and 7, the source resonator powers a plurality of other circuit breaker apparatus within the circuit breaker panel.

Preferably, the remote unit located remotely to monitor power usage and turn current supply on and off using the controller unit.

Preferably, the circuit breaker apparatus comprising a capacitor coupled to the line current or wireless power transmission systems to store backup-power to provide back-up power supply to the circuit breaker in case of short-circuit.

Preferably, the remote unit is a mobile device having an interface to receive and transmit data or signal from the circuit breaker apparatus.

Further, the circuit breaker panel has a ferrite sheet to block and absorb electromagnetic noises produced by the wireless power transmission systems.

Preferably, the wireless power transmission system is a power from a utility source.

Preferably, the controller unit coupled to a sensing circuitry for performing the circuit breaker operation of the circuit breaker apparatus.

Preferably, the wireless transmitter unit connected to a network or wireless network transmit the data or receive the signal.

Preferably, the remote unit connected to a network or wireless network receive the data or transmit the signal.

Typically, the existing Electronic Circuit Breaker (ECB) are all powered via wire from the Main Power source, which are mainly Live & Neutral as power source.

The proposed invention relates to an Electronic Miniature Circuit Breaker with a Wireless Power system.

As employed herein, the statement that two or more parts are "coupled" together shall mean that the parts are joined together either directly or joined through one or more intermediate parts.

As employed herein, the term "processor" shall mean a programmable analogue and/or digital device that can store, retrieve, and process data; a microprocessor; a microcontroller; a microcomputer; a central processing unit; or any suitable processing device or apparatus.

The present innovation may be embodied in other specific forms without departing from its essential characteristics. The described embodiments are to be considered in all respects only as illustrative and not restrictive. The scope of the innovation is, therefore indicated by the appended claims rather than by the foregoing description. All changes, which come within the meaning and range of equivalency of the claims, are to be embraced within their scope.

The invention claimed is:

1. A system configured to monitor and program operation of a plurality of circuit breaker (3) apparatus, comprising:
    a transmitter control unit (21) having a power supply and a microcontroller unit;
    a source resonator having a transmitter IC and a transmitter antenna positioned inside a circuit breaker panel and powered by the transmitter control unit, wherein the transmitter IC is configured for channeling power to the transmitter antenna for radiating a radiofrequency (RF) energy, and for exchanging data with the microcontroller unit of the transmitter control unit (21);
    the plurality of circuit breaker (3) apparatus for performing circuit breaking operations, each of the circuit breaker (3) apparatus further comprising:
    a device resonator having a receiver antenna and a receiver IC, wherein the receiver antenna is configured for receiving the RF energy emitted by the transmitter antenna to power on the receiver IC;
    a monitoring unit (33*b*) receiving power from the receiver antenna and obtaining current usage data of a live wire conducting a line current, the live wire passing through the circuit breaker (3) apparatus;
    a controller unit (33*c*) as a relay control coupled to the monitoring unit (33*b*) for the relay control to turn the line current on and off as the monitoring unit (33*b*) senses a characteristic of the line current; and
    a remote unit located remotely having an interface configured for monitoring the current usage of the circuit breaker apparatus and controlling the controller unit (33*c*) coupled to the circuit breaker (3) apparatus to stop or supply the line current;
    wherein each of the circuit breaker (3) apparatus is powered up by the RF energy received by the receiver antenna without relying on the power from the line current of the live wire, and the source resonator and the receiver IC of the device resonator exchanges data by modulating and demodulating the RF signal when device resonator powers on.

2. The system according to claim 1, wherein the circuit breaker panel has printed circuit board antenna shaped as a rail or panel to mount the circuit breaker (3) apparatus.

3. The system according to claim 1, wherein the source resonator is a printed circuit board antenna, where the printed circuit board antenna is slid or attached onto the circuit breaker panel.

4. The system according to claim 1, wherein the circuit breaker (3) apparatus comprises a seven-segment display or LED display to display status indication of the circuit breaker (3) apparatus.

5. The system according to claim 1, wherein the circuit breaker panel has a rail to mount the circuit breaker (3) apparatus.

6. The system according to claim 1, wherein the source resonator has Serial Peripheral Interface (SPI) and Power Supply Interface.

7. The system according to claim 1, wherein the monitoring unit (33*b*) is a coil configured for allowing current detection.

8. The system according to claim 1, wherein the circuit breaker (3) apparatus comprises a capacitor coupled to the device resonator to store backup-power to provide back-up power supply to the components of the circuit breaker (3) apparatus in case of short-circuit.

9. The system according to claim 1, wherein the circuit breaker panel has a ferrite sheet to block and absorb electromagnetic noises produced by the wireless power transmission.

\* \* \* \* \*